United States Patent
Nagata et al.

(10) Patent No.: US 6,548,141 B2
(45) Date of Patent: *Apr. 15, 2003

(54) CARPET MATERIAL AND METHOD OF PRODUCING SAME

(75) Inventors: Makio Nagata, Yamaguchi; Kyoichi Watanabe, Kanagawa; Satoshi Nagashima, Kanagawa; Masashi Itou, Kanagawa; Kouichi Nemoto, Kanagawa, all of (JP)

(73) Assignee: Nissan Motor Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,281

(22) Filed: Sep. 11, 1998

(65) Prior Publication Data

US 2001/0008673 A1 Jul. 19, 2001

(30) Foreign Application Priority Data

Sep. 12, 1997 (JP) .............................. 9-248556
Dec. 12, 1997 (JP) .............................. 9-342905

(51) Int. Cl.$^7$ .............................. B32B 3/02; B32B 5/06
(52) U.S. Cl. .......................................... 428/95; 442/388
(58) Field of Search .............................. 442/388; 428/95

(56) References Cited

U.S. PATENT DOCUMENTS

| 3,925,130 A | * | 12/1975 | Brown ........................ 428/96 |
| 4,342,802 A | * | 8/1982 | Pickens, Jr. et al. .......... 428/92 |
| 4,389,442 A | * | 6/1983 | Pickens, Jr. et al. .......... 428/93 |
| 4,840,832 A | | 6/1989 | Weinle et al. ................ 428/156 |
| 5,436,046 A | | 7/1995 | Sakamoto .................... 428/36.2 |
| 5,585,185 A | * | 12/1996 | Smith et al. ............. 428/411.1 |
| 5,630,896 A | * | 5/1997 | Corbin et al. ................. 428/95 |
| 5,677,027 A | * | 10/1997 | Masuda et al. ............... 428/96 |
| 5,942,452 A | * | 8/1999 | Daponte et al. ............ 442/382 |

FOREIGN PATENT DOCUMENTS

| DE | 36 25 473 | 2/1988 |
| EP | 07-331574 | 12/1995 |
| EP | 08-108500 | 4/1996 |
| FR | 2 369 084 | 5/1978 |
| FR | 2 708 183 | 2/1995 |
| GB | 2 297 059 | 7/1996 |
| JP | 52-53980 | 4/1977 |
| JP | 56-140175 | 11/1981 |
| JP | 57-205251 | 12/1982 |
| JP | 59-204982 | 11/1984 |
| JP | 01-040650 | 2/1989 |
| JP | 05-272041 | 10/1993 |
| JP | 61-132667 | 6/1996 |
| JP | 8-296165 | 11/1996 |

* cited by examiner

Primary Examiner—Terrel Morris
Assistant Examiner—Christopher C. Pratt
(74) Attorney, Agent, or Firm—Foley & Lardner

(57) ABSTRACT

A carpet material for a floor carpet to be used in a passenger compartment of an automotive vehicle. The carpet material comprises a pile layer formed of nonwoven fabric and serving as a skin. A base fabric layer is provided for supporting the pile layer and is formed of nonwoven fabric and integral with the pile layer. A backing layer is located at the opposite side of the base fabric with respect to the pile layer. The backing layer is formed of nonwoven fabric and integral with the base fabric layer. The nonwoven fabric forming the backing layer has a surface density ranging from 100 to 1000 g/m$^2$ and is formed of polyester-based fiber having a diameter ranging from 20 to 130 μm.

8 Claims, 4 Drawing Sheets

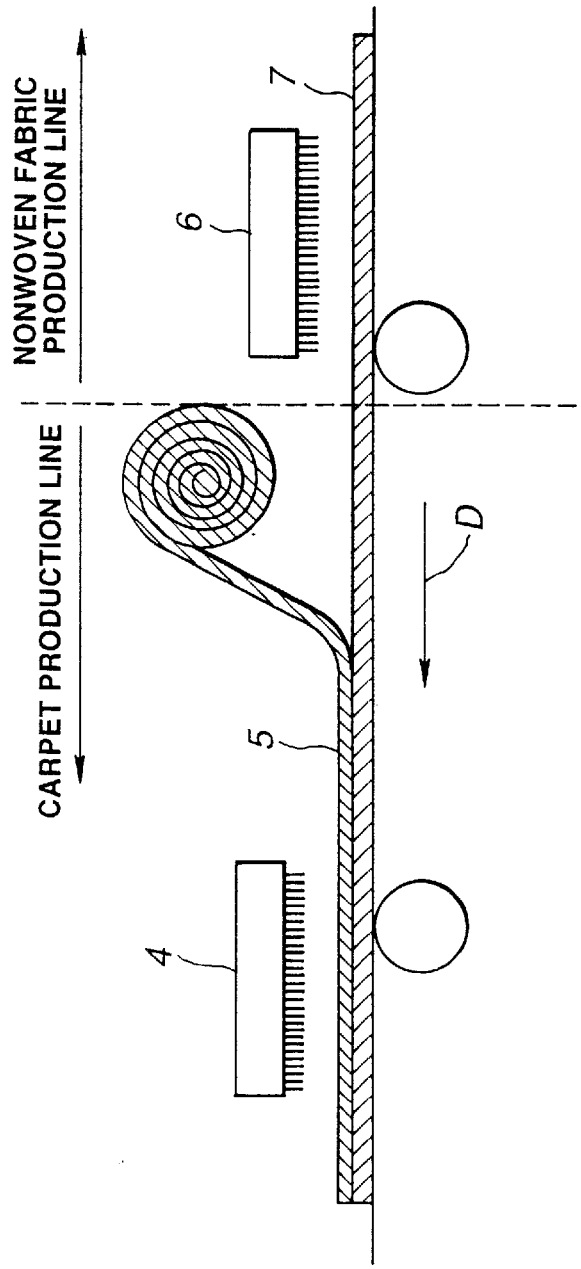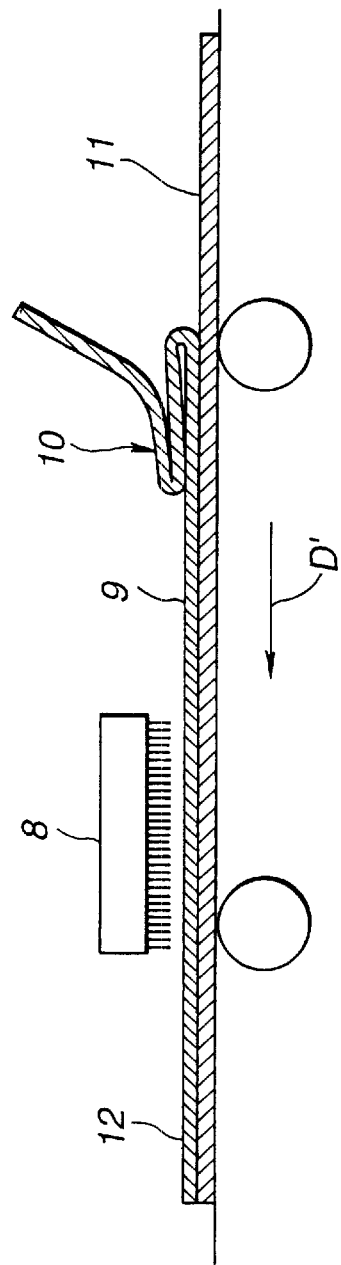

CARPET MATERIAL AND METHOD OF PRODUCING SAME

The contents of Japanese Patent Application No. 9-248556, with a filing date of Sep. 12, 1997 in Japan, and of Japanese Patent Application No. 9-342905, with a filing date of Dec. 12, 1997 in Japan are hereby incorporated by reference.

BACKGROUND OF THE INVENTION

1. Field of the Invention

This invention relates to improvements in a carpet material for a variety of carpets, and more particularly to a carpet material which is improved in acoustic performance such as sound absorbing and insulating performances and suitable for use as a carpet for an automotive vehicle.

2. Description of the Prior Art

A conventional carpet material for a carpet is constituted of a base section formed of nonwoven fabric. The nonwoven fabric base section has a pile layer designed to form cord-tone pattern, dilour-tone pattern or the like for the decorative purpose of the surface of the nonwoven fabric base section. The nonwoven fabric section has a lower impregnated layer which is impregnated with latex for the purpose of fixing the pile layer. Such a conventional carpet material is disclosed in Japanese Patent Provisional Publication Nos. 52-53980 and 61-132667. Additionally, similar carpet materials have been proposed for carpets of automotive vehicles, as disclosed in Japanese Patent Provisional Publication Nos. 56-140175, 57-205251 and 59-204982. In such carpet materials, a backing layer is laminated to a lower impregnated layer of a nonwoven fabric base section like that discussed above, thereby forming a laminated structure. The backing layer is a sheet formed of polypropylene or polyamide, or a thermoplastic sheet formed of ethylne-vinyl acetate copolymer (EVA) or the like containing inorganic material such as calcium carbonate. Furthermore, a carpet material produced by using no latex has been proposed in Japanese Patent Provisional Publication No. 8-296165 (Japanese Patent Application No. 7-99125), in which each of a pile layer and a base fabric layer is mixed with the same amount of thermally melting fiber of a so-called core-and-clad structure to fix fibers in the layer.

SUMMARY OF THE INVENTION

However, the conventional carpet materials are mainly required to have performances of providing design characteristics and wear resistance. Accordingly, the conventional carpet materials have not been required to have acoustical performances such as sound absorbing and insulating performances. However, in recent years, reduction of noise within an automotive vehicle passenger compartment has been required as a part of commercial values, so that acoustic performance has been required for automotive interior materials.

The present invention has been achieved in view of the above and to be intended to provide acoustic performance such as sound absorbing and insulating performances (which have not been required for conventional usual carpet materials) to carpet materials for a variety of carpets to be used in home and in automotive vehicles.

Therefore, an object of the present invention is to provide an improved carpet material for a carpet, which can overcome drawbacks encountered in conventional carpet materials for carpets.

Another object of the present invention is to provide an improved carpet material for a carpet, which can largely contribute to silence in a room provided with the carpet.

A further object of the present invention is to provide an improved carpet material for a carpet, which is high in acoustic performance particularly in a low frequency range.

A still further object of the present invention is to provide an improved carpet material for a floor carpet, which can largely contribute to noise reduction in a passenger compartment of an automotive vehicle provided with the carpet.

A still further object of the present invention is to provide an improved carpet material for a carpet, which is wholly formed of nonwoven fabric.

A first aspect of the present invention resides in a carpet material comprising a pile layer formed of nonwoven fabric and serving as a skin. A base fabric layer is provided for supporting the pile layer and is formed of nonwoven fabric and integral with the pile layer. A backing layer is located at the opposite side of the base fabric with respect to the pile layer, the backing layer being formed of nonwoven fabric and integral with the base fabric layer. Additionally, the nonwoven fabric forming the backing layer has a surface density ranging from 100 to 1000 $g/m^2$ and is formed of polyester-based fiber having a diameter ranging from 20 to 130 $\mu$m.

A second aspect of the present invention resides in a floor carpet for an automotive vehicle, formed of a carpet material. The carpet material comprises a pile layer formed of nonwoven fabric and serving as a skin. A base fabric layer is provided for supporting the pile layer and is formed of nonwoven fabric and integral with the pile layer. A backing layer is located at the opposite side of the base fabric with respect to the pile layer, the backing layer being formed of nonwoven fabric and integral with the base fabric layer. Additionally, the nonwoven fabric forming the backing layer has a surface density ranging from 100 to 1000 $g/m^2$ and is formed of polyester-based fiber having a diameter ranging from 20 to 130 $\mu$m.

A third aspect of the present invention resides in a floor carpet for an automotive vehicle, the floor carpet being formed of a carpet material. The carpet material comprises a pile layer formed of nonwoven fabric which is formed of polyester-based fiber and serving as a skin. A base fabric layer is provided for supporting the pile layer and is formed of nonwoven fabric and integral with the pile layer, the nonwoven fabric being formed of polyester-based fiber. A backing layer is located at the opposite side of the base fabric with respect to the pile layer, the backing layer being formed of nonwoven fabric and integral with the base fabric layer, the nonwoven fabric being formed of polyester-based fiber. Additionally, the backing layer has a rate of thickness ranging from 10 to 50% relative to a whole thickness of the carpet material, and a storage elastic modulus (log E') in a dynamic viscoelasticity test, ranging from 5 to 10 Pa within a measuring temperature range of from 0 to 50° C. Further, the nonwoven fabric forming the backing layer has a surface density ranging from 100 to 1000 $g/m^2$ and is formed of polyester-based fiber having a diameter ranging from 20 to 130 $\mu$m. Furthermore, the nonwoven fabric forming the backing layer is formed of a mixture of polyester-based staple fiber having a diameter ranging from 20 to 130 $\mu$m, and binder fiber in an amount ranging from 20 to 80% by weight. The binder fiber is of a core-and-clad type conjugate structure and has a core formed of polyester, and a clad formed of low melting point copolyester having a melting point ranging from 110 to 180° C.

A fourth aspect of the present invention resides in a method of producing a carpet material, comprising the following steps: (a) forming a first nonwoven fabric constituting at least a pile layer; (b) forming a second nonwoven fabric constituting at least a backing layer; (c) laminating the second nonwoven fabric on the first nonwoven fabric to form a laminated structure; and (d) accomplishing a needle punch treatment onto the laminated structure so as to make needle punching in a direction of from the second nonwoven fabric to the first nonwoven fabric by a needle punch device, in which a part of the first woven fabric is pushed out downward to form the pile layer and simultaneously to make integral the pile layer and the backing layer with each other.

A fifth aspect of the present invention resides in a method of producing a carpet material, comprising the following steps: (a) forming a first nonwoven fabric constituting a pile layer and a base fabric layer under a needle punch treatment; (b) forming a second nonwoven fabric constituting a backing layer by using a card layer type nonwoven fabric producing device; (c) laminating the second nonwoven fabric on the first nonwoven fabric to form a laminated structure; and (d) accomplishing a needle punch treatment onto the laminated structure so as to make needle punching in a direction of from the second nonwoven fabric to the first nonwoven fabric by a needle punch device, in which a part of the first woven fabric is pushed out downward to form the pile layer and simultaneously to make integral the pile layer, the base fabric layer and the backing layer with each other.

A sixth aspect of the present invention resides in a method of producing a carpet material, comprising the following steps: (a) forming a first nonwoven fabric constituting a pile layer, and a second nonwoven fabric constituting a base fabric layer and a backing layer, by a card layer type nonwoven fabric producing device on a single production line, the second nonwoven fabric having a surface density which is 1.5 to 5 times of that of the first nonwoven fabric; (b) laminating the second nonwoven fabric on the first nonwoven fabric to form a laminated structure; and (c) accomplishing a needle punch treatment onto the laminated structure so as to make needle punching in a direction of from the second nonwoven fabric to the first nonwoven fabric by a needle punch device, in which a part of the first woven fabric is pushed out downward to form the pile layer, while a part of the second woven fabric is tightened by an upwardly bent portion of each needle of the needle punch device so as to form a high density section serving as the backing layer.

According to the present invention, the carpet material can provide excellent sound insulating and absorbing performances throughout a wide frequency region including the low frequency range and the high frequency range, while fulfilling the inherently required conditions as a carpet material. The carpet material of the present invention is very effective in sound insulating performance particularly in the low frequency range, which is important for a carpet to be used in a passenger compartment in an automotive vehicle.

BRIEF DESCRIPTION OF THE DRAWINGS

FIG. 4 is a schematic sectional illustration of a production line for the carpet material according to the present invention;

FIG. 5 is a schematic sectional illustration of another production line for the carpet material according to the present invention.

DETAILED DESCRIPTION OF THE INVENTION

According to the present invention, a carpet material comprises: a pile layer formed of nonwoven fabric and serving as a skin; a base fabric layer for supporting the pile layer, formed of nonwoven fabric and integral with the pile layer; and a backing layer located at opposite side of the base fabric with respect to the pile layer, the backing layer being formed of nonwoven fabric and integral with the base fabric layer; wherein the nonwoven fabric forming the backing layer has a surface density ranging from 100 to 1000 $g/m^2$ and is formed of polyester-based fiber having a diameter ranging from 20 to 130 $\mu$m.

Figure 1:
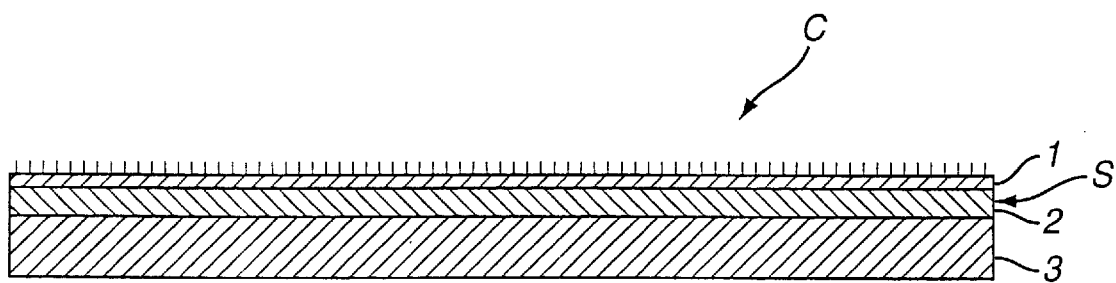
FIG. 1 is a fragmentary schematic vertical sectional view of a carpet material according to the present invention.

More specifically, as shown in FIG. 1, the carpet material C is constituted of the pile layer 1, the base fabric layer 2, and the backing layer (which may includes a mass back layer) 3. The pile layer is located at the surface side of the base fabric layer 2 and serves as the skin. The backing layer 3 is located at the reverse surface side of the base fabric layer 2. Each of the pile layer 1, the base fabric layer 2 and the backing layer 3 is formed of nonwoven fabric. The pile layer 1 and the base fabric layer 2 serve as a skin layer S and usually formed integral with each other. The skin layer S is formed completely integral with the backing layer 3. In other words, the skin layer S and the backing layer 3 are formed respectively independently from each other and thereafter are combined with each other or laminated one upon another.

In this connection, a conventional carpet material includes a pile layer located at the surface side, a base fabric layer, and a hard or coagulative sound-insulating backing layer or mass back layer which is located at the reverse surface side of the backing layer. In contrast, the whole carpet material of the present invention is formed of nonwoven fabric to be provided with acoustic performance which is not required for the conventional usual carpet material.

The pile layer 1 provides design characteristics to the skin layer S and therefore has, for example, cord-tone pattern, dilourtone pattern and/or the like. The pile layer 1 is supported by the base fabric layer 7 so that these two layers 1, 2 are integral with each other and function to provide design to the carpet material C.

The backing layer 3 is located beneath the skin layer S and serves as a main part of a carpet for an automotive vehicle. This backing layer 3 functions to provide a weight required for improving an acoustic performance, to the carpet material C. The backing layer 3 may be called a mass back layer. Otherwise, a layer corresponding to the mass back layer may be laminated to the backing layer 3. Accordingly, the backing layer 3, the mass back layer and the backing layer 3 provided with the laminated layer corresponding to the mass back layer are referred to as a "backing layer" in the lump.

The carpet material of the invention features the fact that the backing layer 3 is formed of fiber aggregate (material) or nonwoven fabric. It is to be noted that the backing layer 3 of nonwoven fabric is very soft as compared with a conventional backing layer formed of a sheet made of thermoplastic resin or the like under a constant weight. It has been experimentally found that the sound insulating performance in a low frequency range can be improved in proportion to the degree of the softness of the backing layer 3.

The pile layer 1 and the base fabric layer 2 constituting the skin layer S are integral with each other. The backing layer 3 formed of the fibrous material is formed independently from the skin layer S, and then the backing layer 3 is integrally combined with the skin layer S. The backing layer 3 may be formed integral with the skin layer S. In any case, the backing layer 3 of the invention is sufficiently soft as compared with the conventional sheet made of plastic, and therefore the backing layer 3 is effective for improving a sound insulating performance in the low frequency range.

The nonwoven fabric of the backing layer 3 is constituted of polyester fiber which is very general fiber and characterized by being high in freedom to change diameter, length and cross-sectional shape of the fiber. As a result, the softness of the backing layer 3 can be very effectively regulated by constituting the backing layer 3 of the polyester fiber. Additionally, polyester fiber is a thermosetting resin and easy to be recycled, and desirable from the viewpoint of environmental protection. It is a matter of course that such recycled polyester fiber may be contained in raw material (polyester fiber) of the backing layer 3. In other words, the recycled polyester fiber may be mixed with virgin polyester fiber. In this regard, there is the recycled polyester fiber which is almost the same in mechanical strength as the virgin polyester fiber. It becomes important to positively use such recycled polyester fiber from the viewpoint of environmental protection.

The nonwoven fabric forming the backing layer 3 has a surface density ranging from 100 to 1000 g/m$^2$ and is constituted of polyester fiber having a diameter ranging from 20 to 130 $\mu$m. In order to meet the acoustic performance of the carpet material C, a certain weight is necessary for the backing layer 3. If the surface density of the nonwoven fabric of the backing layer 3 is lower than 100 g/m$^2$, a necessary sound insulating performance cannot be obtained. If the surface density exceeds 1000 g/m$^2$, the backing layer is hardened as compared with that of the conventional carpet material thereby making it impossible to obtain the necessary sound insulating performance, while increasing the weight of an automotive component part.

It is necessary that the diameter of polyester fiber forming the backing layer 3 is larger than 20 $\mu$m. This is because it is difficult to produce polyester fiber having a diameter smaller than 20 $\mu$m thereby making it difficult to stably supply such fine polyester fiber while increasing production cost of the carpet material. Further, it is necessary that the diameter of polyester fiber is not larger than 130 $\mu$m. If the diameter exceeds 130 $\mu$m, the backing layer 3 becomes too hard to meet the necessary acoustic performance.

It is preferable that the rate of the thickness of the backing layer 3 is within a range of from 10 to 50% of the whole thickness of the carpet material C. If the thickness is less than 10%, durability of the carpet material C is inferior so as not to be durable for long time use. If the thickness exceeds 50%, the thickness of the carpet material C itself becomes too large to be practical.

It is also preferable that the nonwoven fabric forming the backing layer 3 is a mixture of polyester-based staple fiber in an amount (mixing rate) ranging from 80 to 20% by weight, and binder fiber in an amount (mixing rate) ranging from 20 to 80% by weight. The binder fiber is of the core-clad type conjugate structure in which a core is formed of high melting point polyester while the clad is formed of low melting point copolyester. Mixing the binder fiber with the polyester-based staple fiber makes it possible to thermally shape or form the carpet material C thereby increasing freedom in shaping of the carpet material C. This is very effective particularly in case that the carpet material C is for a carpet to be used in an automotive vehicle, in which it is preferable to shape the carpet material C so as to fit the shape of a floor of the vehicle. If the mixing rate of the binder fiber is less than 20% by weight, formability of the carpet material C is inferior so that shape-maintainability of the carpet material C is degraded. If the mixing rate exceeds 80% by weight, the backing layer 3 becomes hard thereby possibly affecting sound insulating performance in the low frequency range.

Preferably, the polyester-based staple fiber of the nonwoven fabric forming the backing layer 3 is usual regular fiber having a circular cross-section, regular hollow fiber having a circular cross-section, solid or hollow side-by-side type conjugate fiber, fiber having a non-circular (deformed) cross-section, and/or axially dividable fiber which is dividable in the direction of axis of the fiber.

Even in case that the polyester-based staple fiber is usual regular fiber having a circular cross-section, the backing layer 3 becomes sufficiently soft. In order to further improve the sound insulating performance of the carpet material C, it is effective to use fiber having the non-circular (deformed) cross-section as the polyester-based staple fiber. Using fiber having the non-circular (deformed) cross-section not only softens the backing layer 3 but also increases a surface area per unit area, thereby raising the acoustic or sound absorbing performance of the carpet material C. Examples of the fiber having the non-circular (deformed) cross-section are fiber having flat cross-section, fiber having a Y-shaped cross-section, fiber having a W-shaped cross-section, fiber having oval cross-section, fiber having an ultra-flat cross-section, and the like. These fibers are effective to attain a high sound insulating or absorbing performance.

The axially dividable fiber is formed as a bundle of ultra-fine fibers. Examples of the axially dividable fiber are hexamerous-dividable fiber which is dividable into six fine fibers each having a generally sextant cross-section having an angle of 60 degrees at the cross-sectional center of the dividable fiber, and octamerous-dividable fiber which is dividable into eight fine fibers each having a generally octant cross-section having an angle of 45 degrees at the cross-sectional center of the dividable fiber. These dividable fibers are effective for lowering a storage elastic modulus and a surface area of the backing layer 3. Such dividable fiber increases in its surface area and the like by dividing it, so that the number of the fine fibers to be divided is not limited. Usually produced and used is the dividable fiber which is dividable into a plurality of fine fibers each having a cross-section having an angle ranging from 30 to 60 degrees at the cross-sectional center of the dividable fiber, and therefore it is economical to use such a dividable fiber for the backing layer 3.

It will be understood that the hollow fiber is also effective for increasing the surface area of the backing layer 3 under the same surface density. The regular fiber is mechanically crimped and high in elasticity in a surface direction of the backing layer 3. The conjugate fiber is chemically crimped and contributes to making the backing layer 3 bulky. Thus, both the regular fiber and the conjugate fiber are effective for adjusting the softness of the backing layer 3. A mixture of the regular fiber and the conjugate fiber is also very effective to adjust the softness of the backing layer 3. There are a variety of kinds of blends of different fibers, which are also effective for meeting the same purpose.

The low melting point copolyester of the binder fiber has preferably a melting point ranging from 110 to 180° C. This range is preferable in order to provide a good formability to the backing layer 3. If the melting point is lower than 110° C., it is difficult to maintain the shape of the carpet in case that the carpet is to be used, for example, under a high temperature atmosphere. If the melting point exceeds 180° C., an allowable range in a heating condition becomes narrow thereby suppressing freedom in formation or shaping the backing layer 3. Additionally, this makes the formation condition severe thereby suppressing a wide use of the backing layer 3 for various purposes.

Preferably, the storage elastic modulus (log E') in a dynamic viscoelasticity test, of the nonwoven fabric forming the backing layer 3 is within a range of from 5 to 10 Pa in a measuring temperature range of from 0 to 50° C. Here, the storage elastic modulus is determined by the dynamic viscoelasticity test according to JIS (Japanese Industrial Standard) K7198-1991.

Figure 2:
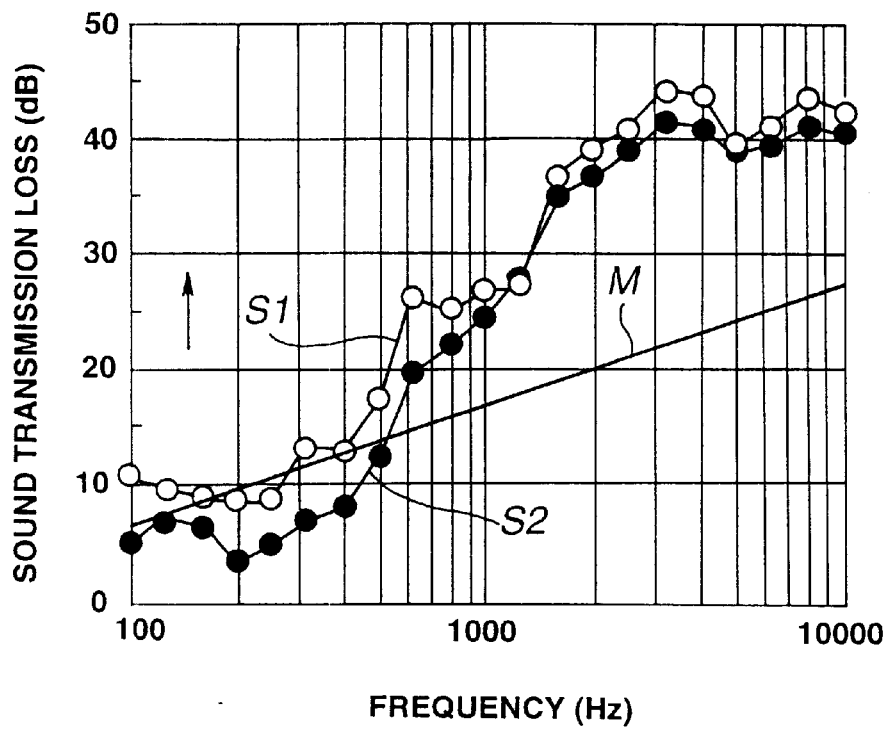
FIG. 2 is a graph showing comparison data in sound transmission loss (sound insulating performance) between the carpet material of the present invention and a conventional carpet material.

The softness of the backing layer 3 is quantitatively represented by a value of the storage elastic modulus in the dynamic viscoelasticity test. The guideline or index of the softness of the backing layer is also decided by the value of this storage elastic modulus. It is preferable from the viewpoint of improving the sound insulating performance in the low frequency range, that the value of the storage elastic modulus (log E') is as small as possible within the measuring temperature range of from 0 to 50° C. However, the sound insulating performance in the low frequency range corresponds to that in a region of primary resonance of a double-wall sound insulating structure constituted of the backing layer and an outer wall of the automotive vehicle. It is usual that the sound insulating performance in this low frequency range lowers relative to that according to a "mass law (rule) of transmission loss". However, it has been found that drop in the sound insulating performance in this low frequency range can approach that according to the mass law as much as possible by operating the storage elastic modulus (log E') as shown in FIG. 2 in which a line M indicates the mass law of transmission loss. Additionally, a high sound insulating performance depending on the usual double-wall sound insulating structure can be obtained in a high frequency range. The data of FIG. 2 were experimentally obtained under a condition where the weights of samples (backing layers) were the same. In FIG. 2, a curve S1 indicates a sound insulating performance (sound transmission loss) of the backing layer of the carpet material of Example 1 which will be discussed after. A curve S2 indicates a sound insulating performance of the backing layer of the carpet material of Comparative Example which will be discussed after.

Figure 3:
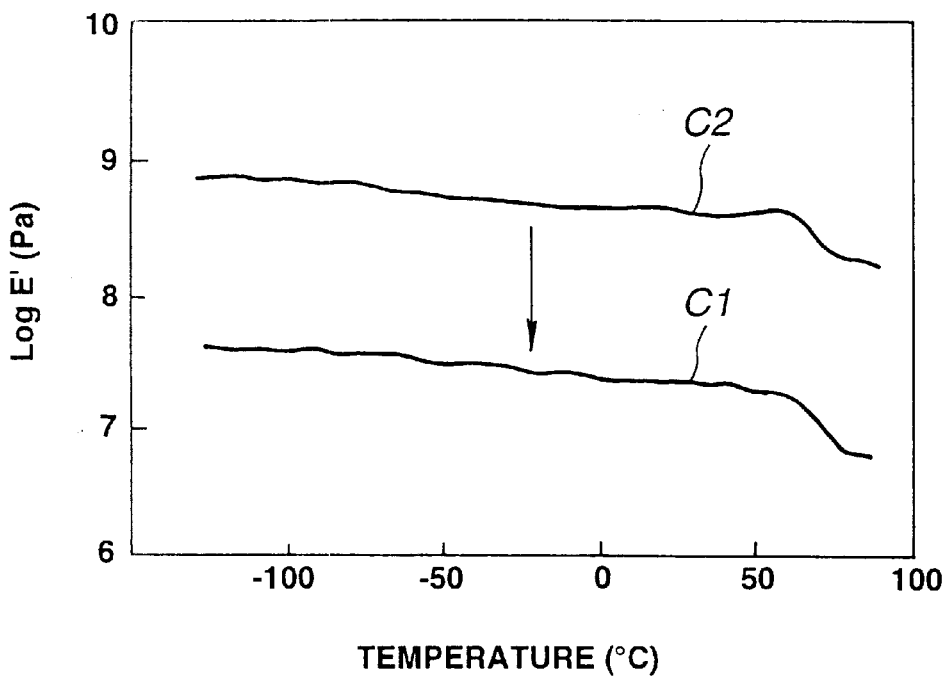
FIG. 3 is a graph showing improvement in storage elastic modulus by the carpet material according to the present invention.

In this regard, the storage elastic modulus not higher than 5 Pa in the temperature range of from 0 to 50° C. is basically difficult to be obtained using polyester fiber. If the storage elastic modulus is more than 10 Pa in the temperature range of from 0 to 50° C., such a softness as to improve the sound insulating performance in the low frequency range cannot be obtained, so that the sound insulating performance is largely lowered relative to that according to the mass law in the low frequency range like that by the usual double-wall sound insulating structure. Thus, the storage elastic modulus more than 10 Pa is ineffective for improving the sound insulating performance in the low frequency range. In this connection, it is very effective for improving the sound insulating performance in the low frequency range, to mechanically rumple the backing layer 3 so as to soften the nonwoven fabric backing layer 3. This has been experimentally confirmed as shown in FIG. 3, in which a curve C1 indicates the nonwoven fabric (forming the backing layer 3) according to the present invention and subjected to a mechanically rumpling treatment; and a curve C2 indicates the same nonwoven fabric as that of the curve C1 with the exception that the nonwoven fabric was not subjected to the mechanically rumpling treatment. The nonwoven fabric of the curve C1 corresponds to that of the backing layer of the carpet material of Example 1 (discussed after). FIG. 3 depicts that such mechanically rumpling treatment is very effective for lowering the storage elastic modulus of the nonwoven fabric of the backing layer 3.

It will be appreciated that it is very effective to use the carpet material of the present invention as a floor carpet for an automotive vehicle, under a circumstance where requirement for silence in automotive vehicles has become stronger year by year. Combining the carpet material of the present invention with a sound insulating material can provide a floor carpet which has high sound insulating and absorbing performances throughout the low to high frequency ranges as compared with automotive vehicle floor carpets formed of the conventional carpet materials.

In order to produce a floor carpet for an automotive vehicle by using the carpet material of the present invention, the carpet material of the present invention is combined with a sound insulating layer formed of fiber aggregation. More specifically, the carpet material of the present invention is put on the sound insulating layer. Then, the carpet material and the sound insulating layer is heated at a temperature not lower than the melting point of the low melting point copolyester of the binder fiber, so that the backing layer is bonded to the sound insulating layer thereby forming an integrally laminated product or floor carpet for an automotive vehicle. This production method of the floor carpet is simple and excellent in process, and economically advantageous because of making new facility investment unnecessary and of capability of a wide use.

Next, method of producing the carpet material C of the present invention will be discussed with reference to FIG. 4 in which production operation of the carpet material C proceeds along a direction D.

The nonwoven fabric 7 constituting the pile layer 1 and the base fabric layer 2 is formed by making a needle punch treatment with a needle punch device 6. The nonwoven fabric 5 constituting the backing layer 3 is produced by a card layer type nonwoven fabric producing device (not shown) in the same production line or a separate production line. The thus produced nonwoven fabric 5 is put or laminated on the nonwoven fabric 7. Then, a needle punch treatment by a needle punch device 4 is made vertically or in a direction of from the upper side of the nonwoven fabric 5 to the nonwoven fabric 7, in which a part of the nonwoven fabric 7 is pushed out downward thereby forming the pile layer 1. As a result, the pile layer 1, the base fabric layer 2 and the backing layer 3 are integrally formed in a laminating manner. It will be appreciated that the carpet material C of the three-layer laminated structure can be easily produced by the above production method.

Otherwise, the carpet material C of the present invention may be produced by the following production method as shown in FIG. 5 in which production operation of the carpet material C proceeds along a direction D': A nonwoven fabric 1 constituting the pile layer 1 and a nonwoven fabric 10 constituting the base fabric layer 2 and the backing layer 3 are produced in the same production line by a card layer type nonwoven production device (not shown). The nonwoven fabric 10 has a surface density of 1.5 to 5 times of that of the nonwoven fabric 11. In this production line, the nonwoven fabric 10 is put or laminated on the nonwoven fabric 11, and then a needle punch treatment with a needle punch device 8 is made vertically or in a direction of from the upper side of the nonwoven fabric 10 to the nonwoven fabric 11, in which a part of the nonwoven fabric 11 is pushed out downward thereby forming the pile layer 1 while a part of the nonwoven fabric 10 is tightened by an upwardly bent portion of each needle of the needle punch device 8 thereby forming a high density layer or the backing layer 3. As a result, the pile layer 1, the base fabric layer 2 and the backing layer 3 are integrally formed in a laminating manner. It will be appreciated that, according to this production method, the nonwoven fabric 10 constituting the base fabric layer 2 and the backing layer 3 is formed integral, in which a part of the nonwoven fabric 10 functions as the backing layer 3. In this regard, the nonwoven fabric 10 has the surface density of 1.5 to 5 times of that of the nonwoven fabric 11. If the nonwoven fabric 10 has the surface density smaller than 1.5 times of that of the nonwoven fabric 11, the part of the nonwoven fabric 10 cannot function as the backing layer. If the nonwoven fabric 10 has the surface density exceeding 5 times of that of the nonwoven fabric 11, the surface density of the nonwoven fabric 10 becomes too high to be pricked with needles of the needle punch device 8 so that the needle punch treatment by the needle punch device 8 becomes impossible while the needles tend to be broken. Thus, production process for the carpet material C will be made impossible. It will be appreciated that sufficient sound insulating and absorbing performances can be attained by the thus formed carpet material in which a part of the nonwoven fabric 10 functions as the backing layer 3.

EXAMPLES

The present invention will be more readily understood with reference to the following Examples in comparison with Comparative Examples; however, these Examples are intended to illustrate the invention and are not to be construed to limit the scope of the invention.

The carpet materials prepared according to Examples and Comparative Examples were subjected to a sound transmission loss test in order to evaluate a sound insulating performance.

Figure 6:
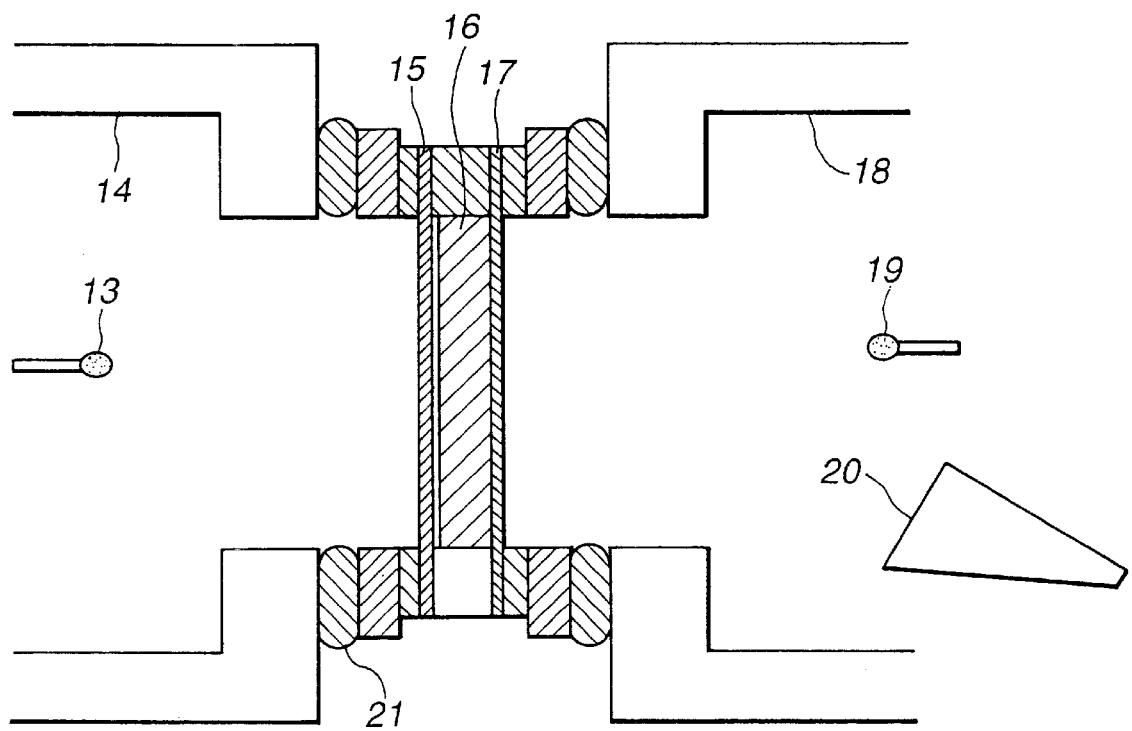
FIG. 6 is a fragmentary sectional view of a system for measuring a sound transmission loss of a specimen (the carpet material) for the purpose of evaluating the sound insulating performance.

The sound transmission loss test was conducted as follows: The test was to measure a sound transmission loss by using two reverberation rooms, according to JIS (Japanese Industrial Standard)—K1416, as shown in FIG. 6. First, a specimen (carpet material) 15 prepared according to Examples and Comparative Examples was put on an insulator material 16 (formed of a polyester fiber sound absorbing material) in such a manner that the backing layer faced the insulator material 16 thus to prepare a test structure. Then, a steel sheet 17 having a thickness of 1 mm was set to a window of a sound source-side reverberation room 18 in which a sound source or speaker 20 was located. The test structure was bonded to the steel sheet 17 in such a manner that the insulator material 16 was in contact with the steel sheet 17, thereby setting the specimen (carpet material) 15 at a predetermined position while constituting a double-wall sound insulating structure of the steel sheet 17 and the backing layer of the specimen 15. Additionally, the specimen 15 was sealingly set through a seal member 21 to a window of a measurement-side reverberation room 14. In this state, a sound pressure generated from the speaker 20 in the sound source-side reverberation room 18 was measured by a sound source-side microphone 19, while sound transmitted through the specimen 15 was measured by a measurement-side microphone 13 located in the measurement-side reverberation room 14 thereby to obtain a sound pressure of the sound passed through the specimen 15. The sound transmission loss of the specimen was obtained by the difference between the sound pressure in sound source-side reverberation room 18 and the sound pressure in the measurement-side reverberation room 14.

Example 1

A carpet material (Specimen No. 1) was produced including three layers (a pile layer, a base fabric layer and a backing layer) formed respectively of nonwoven fabrics. The pile layer and the base fabric layer supporting the pile layer were formed of fibers whose main component was polyester fiber. The backing layer was formed on the back-side surface (opposite to a surface on which the pile layer is formed) of the base fabric layer. The backing layer consisted of 70 wt % (mixing rate) of solid regular polyester-based fiber (main fiber) having a circular cross-section and a diameter of about 40 $\mu$m, and 30 wt % (mixing rate) of polyester-based binder fiber having a diameter of about 40 $\mu$m. Each binder fiber included a clad which was formed of copolyester and has a melting point of about 110° C.

The backing layer had a surface density of 400 $g/m^2$, and a rate of thickness of 20% relative to the whole thickness of the carpet material. Additionally, the nonwoven fabric of the backing layer had a storage elastic modulus (log E') in a dynamic viscoelasticity test, of 6.4 Pa on an average within a measuring temperature range of from 0 to 50° C.

Example 2

A carpet material (Specimen No. 2) was produced in the same manner as that of Example 1 with the following exception: The backing layer had a surface density of 800 $g/m^2$, and a rate of thickness of 50% relative to the whole thickness of the carpet material. Additionally, the nonwoven fabric of the backing layer had a storage elastic modulus (log E') in a dynamic viscoelasticity test, of 8.8 Pa on an average within a measuring temperature range of from 0 to 50° C.

Example 3

A carpet material (Specimen No. 3) was produced in the same manner as that of Example 1 with the following exception: The backing layer had a surface density of 200 $g/m^2$, and a rate of thickness of 10% relative to the whole thickness of the carpet material. Additionally, the nonwoven fabric of the backing layer had a storage elastic modulus (log E') in a dynamic viscoelasticity test, of 5.5 Pa on an average within a measuring temperature range of from 0 to 50° C.

Example 4

A carpet material (Specimen No. 4) was produced in the same manner as that of Example 1 with the following exception: The binder fiber (forming part of the backing layer) had a diameter of about 20 $\mu$m. Additionally, the nonwoven fabric of the backing layer had a storage elastic modulus (log E') in a dynamic viscoelasticity test, of 6.0 Pa on an average within a measuring temperature range of from 0 to 50° C.

Example 5

A carpet material (Specimen No. 5) was produced in the same manner as that of Example 1 with the exception that the copolyester of the binder fiber forming the backing layer was about 130° C.

Example 6

A carpet material (Specimen No. 6) was produced in the same manner as that of Example 1 with the exception that the copolyester of the binder fiber forming the backing layer was about 170° C.

Example 7

A carpet material (Specimen No. 7) was produced in the same manner as that of Example 1 with the exception that the copolyester of the binder fiber forming the backing layer is about 200° C.

Example 8

A carpet material (Specimen No. 8) was produced in the same manner as that of Example 1 with the following exception: The backing layer consisted of 20 wt % of the binder fiber, and 80 wt % of the other solid regular fiber having the circular cross-section. Additionally, the nonwoven fabric of the backing layer had a storage elastic modulus (log E') in a dynamic viscoelasticity test, of 6.5 Pa on an average within a measuring temperature range of from 0 to 50° C.

Example 9

A carpet material (Specimen No. 9) was produced in the same manner as that of Example 1 with the following exception: The backing layer consisted of 50 wt % of the binder fiber, and 50 wt % of the other solid regular fiber having the circular cross-section. Additionally, the nonwoven fabric of the backing layer had a storage elastic modulus (log E') in a dynamic viscoelasticity test, of 6.0 Pa on an average within a measuring temperature range of from 0 to 50° C.

Example 10

A carpet material (Specimen No. 10) was produced in the same manner as that of Example 1 with the following exception: The backing layer consisted of 80 wt % of the binder fiber, and 20 wt % of the other solid regular fiber having the circular cross-section. Additionally, the nonwoven fabric of the backing layer had a storage elastic modulus (log E') in a dynamic viscoelasticity test, of 6.2 Pa on an average within a measuring temperature range of from 0 to 50° C.

Example 11

A carpet material (Specimen No. 11) was produced in the same manner as that of Example 1 with the following exception: The fiber (forming the backing layer) other than the binder fiber was the solid regular fiber having the circular cross-section and a diameter of about 20 μm. Additionally, the nonwoven fabric of the backing layer had a storage elastic modulus (log E') in a dynamic viscoelasticity test, of 5.9 Pa on an average within a measuring temperature range of from 0 to 50° C.

Example 12

A carpet material (Specimen No. 12) was produced in the same manner as that of Example 1 with the following exception: The fiber (forming the backing layer) other than the binder fiber was solid conjugate fiber having a circular cross-section and a diameter of about 20 μm. Additionally, the nonwoven fabric of the backing layer had a storage elastic modulus (log E') in a dynamic viscoelasticity test, of 6.0 Pa on an average within a measuring temperature range of from 0 to 50° C.

Example 13

A carpet material (Specimen No. 13) was produced in the same manner as that of Example 1 with the following exception: The fiber (forming the backing layer) other than the binder fiber was fiber having a Y-shaped cross-section and a diameter of about 20 μm. Additionally, the nonwoven fabric of the backing layer had a storage elastic modulus (log E') in a dynamic viscoelasticity test, of 7.1 Pa on an average within a measuring temperature range of from 0 to 50° C.

Example 14

A carpet material (Specimen No. 14) was produced in the same manner as that of Example 1 with the following exception: The fiber (forming the backing layer) other than the binder fiber was fiber having a flat cross-section and a diameter of about 20 μm. Additionally, the nonwoven fabric of the backing layer had a storage elastic modulus (log E') in a dynamic viscoelasticity test, of 6.1 Pa on an average within a measuring temperature range of from 0 to 50° C.

Example 15

A carpet material (Specimen No. 15) was produced in the same manner as that of Example 1 with the following exception: The fiber (forming the backing layer) other than the binder fiber was fiber having an oval cross-section and a diameter of about 20 μm. Additionally, the nonwoven fabric of the backing layer had a storage elastic modulus (log E') in a dynamic viscoelasticity test, of 6.3 Pa on an average within a measuring temperature range of from 0 to 50° C.

Example 16

A carpet material (Specimen No. 16) was produced in the same manner as that of Example 3 with the following exception: The nonwoven fabric of the backing layer was rumpled to become very flexible and soft, so that the nonwoven fabric of the backing layer had a storage elastic modulus (log E') in a dynamic viscoelasticity test, of 5.3 Pa on an average within a measuring temperature range of from 0 to 50° C.

Example 17

A carpet material (Specimen No. 17) was produced in the same manner as that of Example 1 with the following exception: The nonwoven fabric of the backing layer was rumpled to become very flexible and soft, so that the nonwoven fabric of the backing layer had a storage elastic modulus (log E') in a dynamic viscoelasticity test, of 5.8 Pa on an average within a measuring temperature range of from 0 to 50° C.

Example 18

A carpet material (Specimen No. 18) was produced in the same manner as that of Example 2 with the following exception: The nonwoven fabric of the backing layer was rumpled to become very flexible and soft, so that the nonwoven fabric of the backing layer had a storage elastic modulus (log E') in a dynamic viscoelasticity test, of 6.4 Pa on an average within a measuring temperature range of from 0 to 50° C.

Comparative Example 1

A carpet material (Specimen No. 19) was produced including three layers (a pile layer, a base fabric layer and a backing layer). The pile layer was formed of fibers whose main component was polyester fiber. The backing layer was formed on the backside surface (opposite to a surface on which the pile layer is formed) of the base fabric layer. The backing layer was a thermoplastic sheet of polyethylene and had a surface density of 400 g/cm$^2$.

Comparative Example 2

A carpet material (Specimen No. 20) was produced in the same manner as that of Example 1 with the following exception: The backing layer had a surface density of 100 g/m$^2$. Additionally, the nonwoven fabric of the backing layer had a storage elastic modulus (log E') in a dynamic viscoelasticity test, of 5.1 Pa on an average within a measuring temperature range of from 0 to 50° C.

Comparative Example 3

A carpet material (Specimen No. 21) was produced in the same manner as that of Example 1 with the following exception: The backing layer had a surface density of 1100 g/m$^2$, and a rate of thickness of 50% relative to the whole thickness of the carpet material. Additionally, the nonwoven fabric of the backing layer had a storage elastic modulus (log E') in a dynamic viscoelasticity test, of 11.5 Pa on an average within a measuring temperature range of from 0 to 50° C.

Comparative Example 4

A carpet material (Specimen No. 22) was produced in the same manner as that of Example 1 with the following exception: The backing layer had a rate of thickness of 5% relative to the whole thickness of the carpet material. Additionally, the nonwoven fabric of the backing layer had a storage elastic modulus (log E') in a dynamic viscoelasticity test, of 10.8 Pa on an average within a measuring temperature range of from 0 to 50° C.

Comparative Example 5

A carpet material (Specimen No. 23) was produced in the same manner as that of Example 1 with the following exception: The backing layer had a rate of thickness of 80% relative to the whole thickness of the carpet material. Additionally, the nonwoven fabric of the backing layer had a storage elastic modulus (log E') in a dynamic viscoelasticity test, of 6.0 Pa on an average within a measuring temperature range of from 0 to 50° C.

Comparative Example 6

A carpet material was tried to be produced in the same manner as that of Example 1 with the exception that the content (or mixing rate) of the binder fiber forming the backing layer was 10 wt %; however, fiber aggregation could not be formed into a mass and therefore could not provide a nonwoven fabric which functioned as the backing layer.

Comparative Example 7

A carpet material (Specimen No. 24) was produced in the same manner as that of Example 1 with the following exception: The content (mixing rate) of the binder fiber forming the backing layer was 90 wt %. Additionally, the nonwoven fabric of the backing layer had a storage elastic modulus (log E') in a dynamic viscoelasticity test, of 10.6 Pa on an average within a measuring temperature range of from 0 to 50° C.

Comparative Example 8

A carpet material (Specimen No. 25) was produced in the same manner as that of Example 1 with the following exception: The fiber (forming the backing layer) other than the binder fiber was the solid regular fiber having the circular cross-section and a diameter of about 200 μm. Additionally, the nonwoven fabric of the backing layer had a storage elastic modulus (log E') in a dynamic viscoelasticity test, of 11.9 Pa on an average within a measuring temperature range of from 0 to 50° C.

The carpet materials (Specimens) obtained according to Examples 1 to 18 and Comparative Examples 1 to 8 are summarized in Table 1. Each of the obtained carpet materials was subjected to the above-discussed sound transmission loss test to measure the sound transmission loss for the purpose of evaluating the sound insulating performance, except for the carpet material of Comparative Example 6. The sound insulating performances of the carpet materials (Specimens) are shown in Table 1. Each sound insulating performance is an average of a plurality of the measured sound transmission losses which were measured in a frequency range of from 50 to 500 Hz. It will be understood that the sound insulating performance is high in case that the sound insulating performance takes a plus value.

TABLE 1

| | | Backing layer | | | | | | | Sound insulating performance (dB) in low frequency range |
|---|---|---|---|---|---|---|---|---|---|
| | | | Rate (%) of | Main fiber | | Binder fiber | | | Storage |
| Specimen | Layers | Surface density (g/m$^2$) | thickness to whole thickness | Fiber diameter (μm) | Cross-sectional shape | Fiber diameter (μm) | Melting point (° C) | Mixing rate (%) | elastic modulus (Pa) |
| Example 1 | 3 | 400 | 20 | 40 | Circular, solid | 40 | 110 | 30 | 6.4 | 1.8 |
| Example 2 | 3 | 800 | 50 | 40 | Circular, solid | 40 | 110 | 30 | 8.8 | 3.5 |
| Example 3 | 3 | 200 | 10 | 40 | Circular, solid | 40 | 110 | 30 | 5.5 | 1.0 |
| Example 4 | 3 | 400 | 20 | 40 | Circular, solid | 20 | 110 | 30 | 6.0 | 2.1 |

TABLE 1-continued

|  |  |  | Rate (%) of | Backing layer | | | | | | Sound insulating performance (dB) in low frequency range |
|  |  |  |  | Main fiber | | Binder fiber | | | Storage |  |
| Specimen | Layers | Surface density (g/m²) | thickness to whole thickness | Fiber diameter (μm) | Cross-sectional shape | Fiber diameter (μm) | Melting point (°C) | Mixing rate (%) | elastic modulus (Pa) |  |
|---|---|---|---|---|---|---|---|---|---|---|
| Example 5 | 3 | 400 | 20 | 40 | Circular, solid | 40 | 130 | 30 | 6.4 | 2.0 |
| Example 6 | 3 | 400 | 20 | 40 | Circular, solid | 40 | 170 | 30 | 6.4 | 2.1 |
| Example 7 | 3 | 400 | 20 | 40 | Circular, solid | 40 | 200 | 30 | 6.4 | 2.2 |
| Example 8 | 3 | 400 | 20 | 40 | Circular, solid | 40 | 110 | 20 | 6.5 | 1.4 |
| Example 9 | 3 | 400 | 20 | 40 | Circular, solid | 40 | 110 | 50 | 6.0 | 2.3 |
| Example 10 | 3 | 400 | 20 | 40 | Circular, solid | 40 | 110 | 80 | 6.2 | 1.6 |
| Example 11 | 3 | 400 | 20 | 20 | Circular, solid | 40 | 110 | 30 | 5.9 | 2.0 |
| Example 12 | 3 | 400 | 20 | 20 | Conjugate | 40 | 110 | 30 | 6.0 | 1.8 |
| Example 13 | 3 | 400 | 20 | 20 | Y-shape | 40 | 110 | 30 | 7.1 | 2.2 |
| Example 14 | 3 | 400 | 20 | 20 | flat | 40 | 110 | 30 | 6.1 | 2.3 |
| Example 15 | 3 | 400 | 20 | 20 | Oval | 40 | 110 | 30 | 6.3 | 2.2 |
| Example 16 | 3 | 200 | 10 | 40 | Circular, solid | 40 | 110 | 30 | 5.3 | 1.8 |
| Example 17 | 3 | 400 | 20 | 40 | Circular, solid | 40 | 110 | 30 | 5.8 | 2.5 |
| Example 18 | 3 | 800 | 50 | 40 | Circular, solid | 40 | 110 | 30 | 6.4 | 4.0 |
| Comparative Example 1 | 3 | 400 |  |  | Polyethylene sheet | | | | | −2.0 |
| Comparative Example 2 | 3 | 100 | 20 | 40 | Circular, solid | 40 | 110 | 30 | 5.1 | −0.5 |
| Comparative Example 3 | 3 | 1100 | 50 | 40 | Circular, solid | 40 | 110 | 30 | 11.5 | −0.8 |
| Comparative Example 4 | 3 | 400 | 5 | 40 | Circular, solid | 40 | 110 | 30 | 10.8 | −0.7 |
| Comparative Example 5 | 3 | 400 | 80 | 40 | Circular, solid | 40 | 110 | 30 | 6.0 | −1.0 |
| Comparative Example 6 | 3 | 400 | 20 | 40 | Circular, solid | 40 | 110 | 10 | — | — |
| Comparative Example 7 | 3 | 400 | 20 | 40 | Circular, solid | 40 | 110 | 90 | 10.6 | −1.2 |
| Comparative Example 8 | 3 | 400 | 20 | 200 | Circular, solid | 40 | 110 | 30 | 11.9 | 1.5 |

Test results shown in Table 1 depict that the carpet materials produced according to Examples are largely improved in sound insulating performance in the low frequency range (50 to 500 Hz) over the conventional carpet materials produced according to Comparative Examples. Although a large difference has not been found in sound insulating performance between the carpet materials according to Examples and the conventional carpet materials in a high frequency range of not lower than 500 Hz, it was confirmed that the carpet materials according to Examples were high as a whole in sound insulating performance as compared with the conventional carpet materials.

Additionally, was also confirmed that the carpet materials of Comparative Examples produced according to the specification not within the scope of the present invention cannot provide a sufficient value of the sound insulating performance in the low frequency range, or are problematic from the viewpoint of arrangement of the carpet materials so that no carpet material could not be formed.

What is claimed is:

1. A carpet material comprising:
  a base fabric layer for supporting a pile layer formed of nonwoven fabric and integral with said pile layer; and
  a backing layer located at opposite side of said base fabric layer with respect to said pile layer, said backing layer being formed of nonwoven fabric and integral with said base fabric layer, said nonwoven fabric forming said backing layer including polyester based staple fiber in an amount ranging from 80 to 20% by weight, and binder fiber in an amount ranging from 20 to 80% by weight, said binder fiber being of a core and sheath type conjugate structure and having a core formed of high melting point polyester, and a sheath formed of low melting point copolyester, said nonwoven fabric forming said backing layer having a storage elastic modulus in a dynamic viscoelasticity test, ranging from 5 to 10 Pa within a measuring temperature range of from 0 to 50° C.;
  wherein said nonwoven fabric forming said backing layer has a surface density ranging from 100 to 1000 g/m² and 1.5 to 5 times that of the nonwoven fabric forming said pile layer and is formed of polyester-based fiber having a diameter ranging from 20 to 130 μm, said base fabric layer and said backing layer being formed integral with each other by a needle punch treatment, said needle punch treatment by a needle punch device being made in a direction of from said backing layer to said base fabric layer, so as to push out a part of said base fabric layer to form said pile layer.

2. A carpet material as claimed in claim 1, wherein a thickness of said backing layer relative to a whole thickness of said carpet material is within a range of from 10 to 50%.

3. A carpet material as claimed in claim 2, wherein said polyester-based staple fiber of said nonwoven fabric forming said backing layer is at least one selected from the group consisting of fiber having a circular cross-section, hollow fiber having a circular cross-section, solid side-by-side conjugate fiber, hollow side-by-side conjugate fiber, fiber having a non-circular cross-section, and axially dividable fiber which is dividable in a direction of axis of said fiber.

4. A carpet material as claimed in claim 3, wherein said low melting point copolyester has a melting point ranging from 110 to 180° C.

5. A floor carpet for an automotive vehicle, formed of a carpet material, said carpet material comprising:
   a base fabric layer for supporting a pile layer, formed of nonwoven fabric and integral with said pile layer; and
   a backing layer located at an opposite side of said base fabric layer with respect to said pile layer, said backing layer being formed of nonwoven fabric and integral with said base fabric layer, said nonwoven fabric forming said backing layer including polyester-based staple fiber in an amount ranging from 80 to 20% by weight, and binder fiber in an amount ranging from 20 to 80% by weight, said binder fiber being of a core and sheath type conjugate structure and having a core formed of high melting point polyester, and a sheath formed of low melting point copolyester, said nonwoven fabric forming said backing layer having a storage elastic modulus in a dynamic viscoelasticity test, ranging from 5 to 10 Pa within a measuring temperature range of from 0 to 50° C.;
   wherein said nonwoven fabric forming said backing layer has a surface density ranging from 100 to 1000 g/m² and 1.5 to 5 times that of the nonwoven fabric forming said pile layer and is formed of polyester-based fiber having a diameter ranging from 20 to 130 μm, said base fabric layer and said backing layer being formed integral with each other by a needle punch treatment, said needle punch treatment by a needle punch device being made in a direction of from said backing layer to said base fabric layer, so as to push out a part of said base fabric layer to form said pile layer.

6. A floor carpet for an automotive vehicle, said floor carpet being formed of a carpet material, said carpet material comprising:
   a base fabric layer for supporting a pile layer, formed of nonwoven fabric and integral with said pile layer, said nonwoven fabric being formed of polyester-based fiber; and
   a backing layer located at an opposite side of said base fabric layer with respect to said pile layer, said backing layer being formed of nonwoven fabric and integral with said base fabric layer, said nonwoven fabric being formed of polyester-based fiber;
   wherein said backing layer has a thickness ranging from 10 to 50% relative to a whole thickness of said carpet material, and a storage elastic modulus (log E') in a dynamic viscoelasticity test, ranging from 5 to 10 Pa within a measuring temperature range of from 0 to 50° C.;
   wherein said nonwoven fabric forming said backing layer has a surface density ranging from 100 to 1000 g/m² and 1.5 to 5 times that of the nonwoven fabric forming said pile layer and is formed of polyester-based fiber having a diameter ranging from 20 to 130 μm;
   wherein said nonwoven fabric forming said backing layer is formed of a mixture of polyester-based staple fiber having a diameter ranging from 20 to 130 μm, and binder fiber in an amount ranging from 20 to 80% by weight, said binder fiber being of a core and sheath conjugate structure and having a core formed of polyester, and a sheath formed of low melting point copolyester having a melting point ranging from 110 to 180° C.;
   wherein said base fabric layer and said backing layer are formed integral with each other by a needle punch treatment, said needle punch treatment by a needle punch device being made in a direction of from said backing layer to said base fabric layer, so as to push out a part of said base fabric layer to form said pile layer.

7. A carpet material as claimed in claim 6, wherein said base fabric layer and said backing layer are completely integral with each other.

8. A carpet material as claimed in claim 6, wherein said base fabric layer and said backing layer which have been formed separate are integrally laminated.

* * * * *